(12) United States Patent
Srivastava et al.

(10) Patent No.: US 12,190,270 B2
(45) Date of Patent: Jan. 7, 2025

(54) METHODS AND SYSTEMS FOR MANAGING AN INCIDENT

(71) Applicant: Honeywell International Inc., Charlotte, NC (US)

(72) Inventors: Anushka Srivastava, Bangalore (IN); Debasis Dash, Keshava Nagar (IN); Pradeep Kumar Shanmugavelu, Madurai (IN); Vivek Ramachandran, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 191 days.

(21) Appl. No.: 17/744,868

(22) Filed: May 16, 2022

(65) Prior Publication Data

US 2023/0368098 A1 Nov. 16, 2023

(51) Int. Cl.
*G06Q 10/0631* (2023.01)
*G06F 3/0482* (2013.01)
*G06Q 50/26* (2024.01)

(52) U.S. Cl.
CPC ..... *G06Q 10/06316* (2013.01); *G06F 3/0482* (2013.01); *G06Q 50/26* (2013.01)

(58) Field of Classification Search
None
See application file for complete search history.

(56) References Cited

U.S. PATENT DOCUMENTS 6,775,642 B2 8/2004 Remboski et al.
7,076,102 B2 7/2006 Lin et al.
(Continued)

FOREIGN PATENT DOCUMENTS

CN 103733196 A 4/2014
CN 105005839 A 10/2015
(Continued)

OTHER PUBLICATIONS

Wang, et al, "Design and implementation on software platform of emergency management system for traffic incidents." 2008, Canadian Conference on Electrical and Computer Engineering, IEEE, pp. 475-478 (Year: 2008).*

(Continued)

*Primary Examiner* — Ivan R Goldberg
(74) *Attorney, Agent, or Firm* — Seager, Tufte & Wickhem, LLP

(57) ABSTRACT

Methods and systems for managing an incident using an incident management system include receiving an incident and displaying the incident on a display. The incident includes an associated standard operating procedure (SOP) for managing the incident. Each of the SOPs includes one or more corresponding SOP steps. The incident and the associated SOP, including the one or more corresponding SOP steps, are displayed in a SOP view. A user selects one of the one or more SOP steps from the SOP view, which displays an action view that displays one or more categories of assets that are activatable via a user interface for supporting one or more of the SOP steps associated with the incident. The user selects one of the one or more categories of assets for supporting one or more of the SOP steps associated with the incident, allowing the user to activate one or more of the assets to manage the SOP.

14 Claims, 11 Drawing Sheets

(56) References Cited

U.S. PATENT DOCUMENTS

| | | | |
|---|---|---|---|
| 7,683,929 B2 | 3/2010 | Elazar et al. | |
| 7,996,771 B2 | 8/2011 | Girgensohn et al. | |
| 8,428,391 B2 | 4/2013 | Park | |
| 8,457,354 B1 | 6/2013 | Kolar et al. | |
| 8,643,539 B2 | 2/2014 | Pauly et al. | |
| 8,725,298 B2 | 5/2014 | Wallaert | |
| 8,730,040 B2 | 5/2014 | Donovan et al. | |
| 8,890,655 B2 | 11/2014 | Pederson | |
| 8,938,404 B2 | 1/2015 | Capman et al. | |
| 8,994,591 B2 | 3/2015 | Dupray et al. | |
| 9,087,386 B2 | 7/2015 | Morris et al. | |
| 9,244,042 B2 | 1/2016 | Rank | |
| 9,247,211 B2 | 1/2016 | Zhang et al. | |
| 9,286,777 B2 | 3/2016 | Vallone et al. | |
| 9,317,751 B2 | 4/2016 | Li et al. | |
| 9,342,976 B2 | 5/2016 | Pfeffer | |
| 9,355,540 B2 | 5/2016 | Zajac et al. | |
| 9,384,666 B1 | 7/2016 | Harvey | |
| 9,495,754 B2 | 11/2016 | Oami et al. | |
| 9,588,514 B2 | 3/2017 | Christensen et al. | |
| 9,615,066 B1 | 4/2017 | Tran | |
| 9,658,100 B2 | 5/2017 | Park | |
| 9,672,586 B2 | 6/2017 | Sundareson et al. | |
| 9,719,887 B2 | 8/2017 | Ratilla et al. | |
| 9,736,699 B1 | 8/2017 | Rao | |
| 9,740,940 B2 | 8/2017 | Chattopadhyay et al. | |
| 9,776,563 B1 | 10/2017 | Be et al. | |
| 9,992,400 B2 | 6/2018 | Burtey et al. | |
| 10,027,711 B2 | 7/2018 | Gill et al. | |
| 10,115,279 B2 | 10/2018 | Renkis | |
| 10,306,403 B2 | 5/2019 | Maeda | |
| 10,334,437 B2 | 6/2019 | Katsman et al. | |
| 10,354,655 B1 | 7/2019 | White et al. | |
| 10,429,817 B2 | 10/2019 | Katole et al. | |
| 10,475,468 B1 | 11/2019 | Yelchuru et al. | |
| 10,571,294 B2 | 2/2020 | Forutanpour et al. | |
| 10,615,995 B2 | 4/2020 | Yu | |
| 10,616,465 B2 | 4/2020 | Chowdhery et al. | |
| 10,691,715 B2 | 6/2020 | Wesley, Sr. et al. | |
| 10,750,153 B2 | 8/2020 | Sadi et al. | |
| 10,755,730 B1 | 8/2020 | Maurer et al. | |
| 10,990,419 B2 | 4/2021 | Schwartz et al. | |
| 11,030,240 B1 | 6/2021 | Janakiraman et al. | |
| 11,410,533 B1 | 8/2022 | Srivastava et al. | |
| 2001/0049826 A1 | 12/2001 | Wilf | |
| 2003/0101108 A1 | 5/2003 | Botham et al. | |
| 2004/0215669 A1 | 10/2004 | Mettala et al. | |
| 2005/0004797 A1 | 1/2005 | Azencott | |
| 2005/0246373 A1 | 11/2005 | Faulkner et al. | |
| 2006/0004579 A1 | 1/2006 | Claudatos et al. | |
| 2006/0087402 A1 | 4/2006 | Manning et al. | |
| 2006/0227237 A1 | 10/2006 | Kienzle et al. | |
| 2006/0282498 A1 | 12/2006 | Muro | |
| 2007/0008099 A1 | 1/2007 | Kimmel et al. | |
| 2007/0030841 A1 | 2/2007 | Lee et al. | |
| 2007/0037522 A1 | 2/2007 | Liu et al. | |
| 2007/0098303 A1 | 5/2007 | Gallagher et al. | |
| 2007/0132767 A1 | 6/2007 | Wright et al. | |
| 2007/0177023 A1 | 8/2007 | Beuhler et al. | |
| 2007/0189480 A1* | 8/2007 | Salafia | H04M 15/06 379/142.01 |
| 2008/0133300 A1* | 6/2008 | Jalinous | G06Q 10/0637 705/7.29 |
| 2008/0309761 A1 | 12/2008 | Kienzle et al. | |
| 2009/0144772 A1 | 6/2009 | Fink et al. | |
| 2009/0313225 A1 | 12/2009 | Nordlinger | |
| 2010/0005382 A1 | 1/2010 | Curran et al. | |
| 2010/0205563 A1* | 8/2010 | Haapsaari | G06F 3/0485 715/830 |
| 2010/0235535 A1 | 9/2010 | Zhu | |
| 2010/0287161 A1 | 11/2010 | Naqvi | |
| 2010/0296742 A1 | 11/2010 | Chandrasekaran et al. | |
| 2011/0087988 A1 | 4/2011 | Ray et al. | |
| 2011/0118880 A1 | 5/2011 | Diwakar et al. | |
| 2011/0177797 A1 | 7/2011 | Vendrow et al. | |
| 2012/0044354 A1 | 2/2012 | Cheng et al. | |
| 2012/0062732 A1 | 3/2012 | Marman et al. | |
| 2012/0063354 A1 | 3/2012 | Vanga et al. | |
| 2012/0147191 A1 | 6/2012 | Snoussi | |
| 2012/0167146 A1 | 6/2012 | Incorvia | |
| 2012/0245927 A1 | 9/2012 | Bondy | |
| 2012/0299747 A1 | 11/2012 | Schubert et al. | |
| 2012/0330849 A1 | 12/2012 | Nielsen et al. | |
| 2013/0039634 A1 | 2/2013 | M | |
| 2013/0073690 A1 | 3/2013 | Desalvo et al. | |
| 2013/0091432 A1 | 4/2013 | Shet et al. | |
| 2013/0179354 A1 | 7/2013 | Seat | |
| 2013/0226758 A1 | 8/2013 | Reitan | |
| 2013/0229433 A1 | 9/2013 | Reitan | |
| 2013/0321647 A1 | 12/2013 | Khawand et al. | |
| 2013/0332545 A1 | 12/2013 | Primus et al. | |
| 2014/0061293 A1 | 3/2014 | Jayaprakash et al. | |
| 2014/0067875 A1 | 3/2014 | Martinez et al. | |
| 2014/0071287 A1 | 3/2014 | Tu et al. | |
| 2014/0129277 A1 | 5/2014 | Lavrov et al. | |
| 2014/0262130 A1 | 9/2014 | Yenni et al. | |
| 2014/0262134 A1 | 9/2014 | Arensmeier et al. | |
| 2014/0266639 A1 | 9/2014 | Zises | |
| 2014/0266755 A1 | 9/2014 | Arensmeier et al. | |
| 2014/0282257 A1 | 9/2014 | Nixon et al. | |
| 2014/0358285 A1 | 12/2014 | Aggarwal et al. | |
| 2015/0113018 A1 | 4/2015 | Steed et al. | |
| 2015/0134668 A1 | 5/2015 | Popovich | |
| 2015/0169791 A1 | 6/2015 | Lavrov et al. | |
| 2015/0181164 A1 | 6/2015 | Yang et al. | |
| 2015/0248710 A1 | 9/2015 | Medvedovsky et al. | |
| 2015/0278732 A1* | 10/2015 | Fiedler | G06Q 50/26 705/7.22 |
| 2015/0312190 A1 | 10/2015 | Rankin et al. | |
| 2015/0326925 A1 | 11/2015 | Ozkan | |
| 2016/0006989 A1 | 1/2016 | Swanson | |
| 2016/0036899 A1* | 2/2016 | Moody | G06Q 10/0637 709/217 |
| 2016/0091398 A1 | 3/2016 | Pluemer | |
| 2016/0100437 A1 | 4/2016 | Armstrong et al. | |
| 2016/0119424 A1 | 4/2016 | Kane et al. | |
| 2016/0132046 A1 | 5/2016 | Beoughter et al. | |
| 2016/0155063 A1 | 6/2016 | Rich | |
| 2016/0163168 A1 | 6/2016 | Brav et al. | |
| 2016/0171894 A1 | 6/2016 | Harvey | |
| 2016/0191268 A1 | 6/2016 | Diebel | |
| 2016/0203386 A1 | 7/2016 | Porecki et al. | |
| 2016/0227376 A1 | 8/2016 | Hernoud et al. | |
| 2016/0241818 A1 | 8/2016 | Palanisamy et al. | |
| 2016/0252905 A1 | 9/2016 | Tian et al. | |
| 2016/0327296 A1 | 11/2016 | Leising et al. | |
| 2016/0327522 A1 | 11/2016 | Tanaka et al. | |
| 2016/0330062 A1 | 11/2016 | Alloin et al. | |
| 2017/0046018 A1* | 2/2017 | Reichle | G06Q 10/06 |
| 2017/0064262 A1 | 3/2017 | Mozer | |
| 2017/0094474 A1 | 3/2017 | Hernoud et al. | |
| 2017/0153790 A1 | 6/2017 | Mohanam et al. | |
| 2017/0154638 A1 | 6/2017 | Hwang et al. | |
| 2017/0180814 A1 | 6/2017 | Stathacopoulos et al. | |
| 2017/0227965 A1 | 8/2017 | Decenzo et al. | |
| 2017/0325056 A1 | 11/2017 | Mehta et al. | |
| 2017/0332204 A1 | 11/2017 | Hernoud et al. | |
| 2018/0012173 A1 | 1/2018 | Leen et al. | |
| 2018/0040222 A1 | 2/2018 | Findlay et al. | |
| 2018/0181901 A1* | 6/2018 | Babcock | G06Q 10/063112 |
| 2018/0357247 A1 | 12/2018 | Siminoff et al. | |
| 2019/0014289 A1 | 1/2019 | Renkis | |
| 2019/0065855 A1 | 2/2019 | Lerman | |
| 2019/0107845 A1 | 4/2019 | Kaine | |
| 2019/0116466 A1 | 4/2019 | Hernoud et al. | |
| 2019/0158789 A1 | 5/2019 | Snyder et al. | |
| 2019/0236416 A1 | 8/2019 | Wang et al. | |
| 2019/0342357 A1 | 11/2019 | Mitic et al. | |
| 2019/0364389 A1 | 11/2019 | Hernoud et al. | |
| 2020/0030378 A1 | 1/2020 | Chapuis et al. | |
| 2020/0036885 A1 | 1/2020 | Pinel et al. | |
| 2020/0066257 A1 | 2/2020 | Smith et al. | |
| 2020/0074832 A1* | 3/2020 | Vincent | G08B 21/0225 |
| 2020/0109029 A1 | 4/2020 | Pahlke et al. | |

(56) References Cited

U.S. PATENT DOCUMENTS

| | | | |
|---|---|---|---|
| 2020/0111344 A1 | 4/2020 | Raj et al. | |
| 2020/0120458 A1 | 4/2020 | Aldana et al. | |
| 2020/0154048 A1 | 5/2020 | Jones et al. | |
| 2020/0162724 A1 | 5/2020 | Neser et al. | |
| 2020/0196108 A1 | 6/2020 | Hernoud et al. | |
| 2020/0213193 A1 | 7/2020 | Newell et al. | |
| 2020/0271462 A1 | 8/2020 | Ida et al. | |
| 2020/0273277 A1 | 8/2020 | Kerning et al. | |
| 2020/0288295 A1 | 9/2020 | Martin et al. | |
| 2020/0301378 A1 | 9/2020 | McQueen et al. | |
| 2021/0004950 A1 | 1/2021 | Kondamari et al. | |
| 2021/0256060 A1 | 8/2021 | Janakiraman et al. | |
| 2021/0274462 A1 | 9/2021 | Wiacek | |
| 2021/0314757 A1* | 10/2021 | Pellegrini | G06F 3/0482 |
| 2021/0375119 A1* | 12/2021 | Ji | G08B 25/14 |
| 2022/0014895 A1 | 1/2022 | Horelik et al. | |
| 2022/0189004 A1 | 6/2022 | Stluka et al. | |
| 2022/0210376 A1 | 6/2022 | Pratap et al. | |
| 2022/0279473 A1 | 9/2022 | Meganathan et al. | |
| 2022/0300741 A1 | 9/2022 | Chang | |

FOREIGN PATENT DOCUMENTS

| | | |
|---|---|---|
| CN | 103366738 B | 8/2016 |
| CN | 205620145 U | 10/2016 |
| CN | 107221152 A | 9/2017 |
| CN | 208674967 U | 3/2019 |
| CN | 103116825 B | 8/2019 |
| CN | 106657867 B | 8/2019 |
| CN | 211787395 U | 10/2020 |
| DE | 102007062914 A1 | 6/2009 |
| EP | 193317 A1 | 7/2017 |
| IN | 20171021709 A | 8/2017 |
| KR | 101696730 B1 | 2/1999 |
| WO | 2012002645 A2 | 1/2012 |
| WO | 2012092150 A2 | 7/2012 |
| WO | 2016098315 A1 | 6/2016 |
| WO | 2016156401 A1 | 10/2016 |
| WO | 2021203037 A1 | 10/2021 |

OTHER PUBLICATIONS https://www.aspentech.com/en/blog, 6 pages, Jul. 16, 2020.
Audio Analytic-enabling intelligent products through sound recognition 2020. https://www.audioanalytic.com Accessed Dec. 22, 2020.
Audio Analytics Help Prevent Escalations, The Milestone Post, May 31, 2016, https://news.milestonesys.com/audioanalyticshelp-preventescalations/ Accessed Dec. 22, 2020.
Audio Analytics for Smart Cameras, Intelli-Vision, 2020, https://Intelli-Vision.com/ Accessed Dec. 22, 2020.
Dey et al; "Smart City Surveillance: Leveraging Benefits of Cloud Data Stores," First IEEE International Workshop on GLObal Trends in Smart Cities, go SMART 2012, pp. 868-876, Clearwater, 2012.
Emerson, "AMS Suite: Intelligent Device Manager with the DeltaV™ System", http://www2.emersonprocess.com/siteadmincenter/PM%20As~set%20Optimization%20Documents/ProductDataSheets/amsdm_ds_amsdeltav.PDF, Apr. 2015, 5 pp.
Extended European Search Report for Corresponding EP Application 18155934.5, dated Aug. 27, 2018.
Extended European Search Report, EP Application No. 22156074. 1-1213, european Patent Office, May 17, 2022 (8 pages).
European Office Action, Application No. 17824697.1, pp. 4, Oct. 6, 2020.
FBI, "Best Practices for Forensic Image Analysis," 7 pages, Mar. 14, 2005.
Foggia et al; "Audio Surveillance of Roads: A System for Detecting Anamalous Sounds," IEEE Transactions on Intelligent Transportation Systems, vol. 17, No. 1, pp. 278-288, Jan. 2016.
Galmar et al; "Graph-Based Spatio-Temporal Region Extraction," 12 pages, 2006.
Hitachi Solutions Geographical Information System, 7 pages, https://www.hitachi-solutions.com/gis/ Accessed on Mar. 29, 2021.
Indian Application No. 202111027026 filed Jun. 17, 2021.
International Search Report and Written Opinion from related PCT Aplication No. PCT/US2017/038736, dated Oct. 17, 2017, 12 pages.
Lee et al; "STRG-QL: Spatio-Temporal Region Graph Query Language for Video Databases," The Internatonal Society for Optical Engineering, 13 pages, Jan. 2008.
Lee et al; "STRG-Index: Spatio-Temporal Region Graph Indexing for Large Video Databases," department of Computer Science and Engineering at University of Texas, 12 pages, 2005.
Lee et al; "A Graph-Based Approach for Modeling and Indexing Video Data," Department of Computer Science and Engineering, 8 pages, Accessed Nov. 3, 2020.
Liew et al: Recent Developments in Aerial Robotics: A Survey and Prototypes Overview, vol. 2, pp. 1-14, 2017.
Maijala et al; "Environmental Noise Monitoring using Source Classification in Sensors," Applied Acoustics, vol. 129, 10 pages, Jan. 2018.
Nikodem et al; "Multi-Camera Vehicle tracking using Edge Computing and Low-Power Communication," Sensors, vol. 20, 3334, 16 pages, 2020.
Ntalampiras, et al; "On Acoustic Surveillance of Hazardous Situations", 2009 IEEE International Conference on Acoustics, Speech and Signal Processing, 5 pages, Apr. 19-24, 2009.
Pan, et al; "Cognitive Acoustic Analytics Service for Internet of Things", 2017 IEEE International Conference on Cognitive Computing (ICCC), 8 pages, Jun. 25-30, 2017.
Saimurugan, et al; "Intelligent Fault Diagnosis for Rotating Machinery Based on Fusion of Sound Signal", International Journal of Prognostics and Health Management, 10 pages, 2016.
Scardapane et al; "Microphone Array Based Classification for Security Monitoring in Unstructured Environments", AEU_International Journal of Electronics and Communications, vol. 69, Issue 11, 9 pages, Nov. 2015.
Scientific Working Group on Digital Evidence—Best Practices for Computer Forensics, Version 2.1, Jul. 2006.
Scientific Working Group Imaging Technology, Section 7—Best Practices for Forensic Video Analysis, Version 1.0, Jan. 16, 2009.
Screenshot Hitachi Ventara hitachivantara.com/en-us/video/demonstration-hitachi-visualiztion-hitachi-visualization.html 1 page, Accessed on Mar. 29, 2021.
Security Cameras with Audio, Microphone CCTV Cameras|CCTVCameraWorld https://www.cctvcameraworld.com/security-cameras-with-audio.html accessed Dec. 22, 2020.
Sound effects-Royalty Free FX Library/Pond 5 https://www.pond5.com/sound-effects/ Accessed Mar. 22, 2021.
Stepien et al; "Why Real Sounds Matter for Machine Learning," Audio Analytics, 2020.
Street Comer Videos/Royalty-Free Stock Footage, Pond 5 Inc. 2021.
Technology-Audio Analytic/Cutting edge ML technology, Audio Analytics, 2020, https://www.audioanalytic.com/technology/ accessed Dec. 22, 2020.
Trinity ICCC Brochure Trinity Mobility , Pvt. Ltd. Bengaluru, Kornataka 4 pages, www.trinitymobility.com Accessed on Mar. 29, 2021.
U.S. Appl. No. 17/942,713, filed Sep. 12, 2022.
Wang et al; "Videos as Space-Time Region Graphs," Robotics Institute of Carnegie Mellon University, 19 pages, 2018.
Wang, "Distributed Muti-Object Tracking with Multi-camera Systems Composed of Overlapping and Non-Overlapping and Non-overlapping Cameras," Theses, Dissertations, and Student Research from Electrical & Computer Engineering, 47, 197 pages, 2013.
Stansberry, "How to Create an Architechtural Drawing," 9 Pages, updated Apr. 25, 2017, Accessed Feb. 4, 2021.
Adashi, Command and Control Like Never Before, Adashi C&C incident Command Software, 6 pages, Adashi Systems, 2019. Accessed Jun. 30, 2021.
Use cases—Audio Analytic|Embrace the power of sound recognition| 2020, https://www.audioanalytic.com/use-cases/ accessed Dec. 22, 2020.

(56) References Cited

OTHER PUBLICATIONS

Vergouw et al; "Drone Technology: Types, Payloads, Applications, Frequency Spectrum Issues and Future Developments," Chapter 2, 29 pages, 2016.
Hitachi Visualization Suite Datasheet, 2 pages, Aug. 2019.
IBM, 5725-T20 IBM Intelligent Operations Center for Emergency Management V1.6, Canada IBM, 6 pages, Revised Apr. 9, 2019. Accessed Jun. 30, 2021.
Extended European Search Report, EP Application No. 23171001.3, European Patent Office, Oct. 4, 2023 (9 pgs).

* cited by examiner

| Assets | Actions |
|---|---|
| | Attending incoming Emergency call button |
| | Making public announcements |
| | Turn on/off power grid |
| | Broadcasting a message on visual message |
| | Sharing broadcast message on Social Media |

| Workforces | Actions |
|---|---|
| | Sending maintenance truck/Solid waste truck |
| | Sending ambulance incase of an emergency alert |
| | Sending fire trucks incase of an emergency alert |
| | Sending police vehicle incase of an emergency alert |

FIG. 3

METHODS AND SYSTEMS FOR MANAGING AN INCIDENT

TECHNICAL FIELD

The present disclosure relates generally to methods and systems for managing an incident using an incident management system.

BACKGROUND

In incident management systems, incidents are presented to an operator that is responsible for managing the incidents. In many cases, when an incident is identified, the incident management system typically presents the operator with a predefined standard operating procedure (SOP) for managing the identified incident. Standard operating procedures often include predefined steps (e.g., actions, decisions, etc.) that are to be performed in response to a particular incident or incident type. In many cases, different types of assets and/or workforces are available to an operator to manage an incident. In such systems, it is often difficult for the operator to quickly identify and track relevant assets/workforces when managing an incident. In some systems, the operator must go through multiple steps/screens to select and/or activate relevant assets/workforces to initiate and/or monitor progress of some or all of the steps of a standard operating procedure (SOP). It would be desirable to provide a more efficient and intuitive way for managing incidents in an incident management system.

SUMMARY

The present disclosure relates generally to methods and systems for managing an incident using an incident management system. In one example, a method for managing an incident includes receiving one or more incidents, displaying the one or more incidents in an incident view on a display, wherein each of the one or more incidents include an associated standard operating procedure for managing the incident. Each of the standard operating procedures may include one or more corresponding standard operating procedure steps. The illustrative method may further include receiving, via a user interface, a user selection of one of the one or more incidents displayed in the incident view, and in response, displaying the associated standard operating procedure including the one or more corresponding standard operating procedure steps in a standard operating procedure view.

The illustrative method may further include receiving, via a user interface, a user selection of one of the one or more standard operating procedure steps from the standard operating procedure view, displaying an action view that displays one or more categories of assets that are activatable via the user interface for supporting one or more of the standard operating procedure steps associated with the selected incident, receiving via the user interface, a user selection of one of the one or more categories of assets, and in response, displaying one or more available assets of the selected one of the one or more category of assets, and receiving via the user interface a user selection of one or more of the available assets of the selected one of the one or more category of assets, and in response, sending one or more commands to activate the selected one or more available assets for supporting one or more of the standard operating procedure steps associated with the selected incident.

Another example is found in a non-transitory computer readable medium storing instructions that when executed by one or more processors may cause the one or more processors to display a standard operating procedure including the one or more standard operating procedure steps in a standard operating procedure view on a display, receive, via a user interface, a user selection of one of the one or more standard operating procedure steps from the standard operating procedure view, and display an action view that displays two or more categories of assets that are activatable via the user interface for supporting one or more of the standard operating procedure steps associated with the selected incident.

The one or more processors may further receive, via the user interface, a user selection of one of the two or more categories of assets, and in response, display one or more available assets of the selected one of the two or more category of assets, and receive, via the user interface, a user selection of one or more of the available assets of the selected one of the two or more category of assets, and in response, sending one or more commands to activate the selected one or more available assets for supporting one or more of the standard operating procedure steps associated with the selected incident.

Another example is found in a system that includes an input/output port configured to receive one or more incidents, a user interface having a display operatively coupled to the input/output port, the user interface configured to display the one or more incidents in an incident view, and a controller operatively coupled to the input/output port and the user interface. The controller may be configured to display a standard operating procedure for a selected incident of the one or more incidents, including one or more standard operating procedure steps in a standard operating procedure view on the display, receive, via the user interface, a user selection of one of the one or more standard operating procedure steps from the standard operating procedure view, and display an action view on the display that displays two or more categories of assets that are activatable via the user interface for supporting one or more of the standard operating procedure steps associated with the selected incident.

The controller may further be configured to receive, via the user interface, a user selection of one of the two or more categories of assets, and in response, display one or more available assets of the selected one of the two or more category of assets, and receive, via the user interface, a user selection of one or more of the available assets of the selected one of the two or more category of assets, and in response, sending one or more commands to activate the selected one or more available assets for supporting one or more of the standard operating procedure steps associated with the selected incident.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 3 is a chart showing illustrative assets and workforces;

Figure 1:
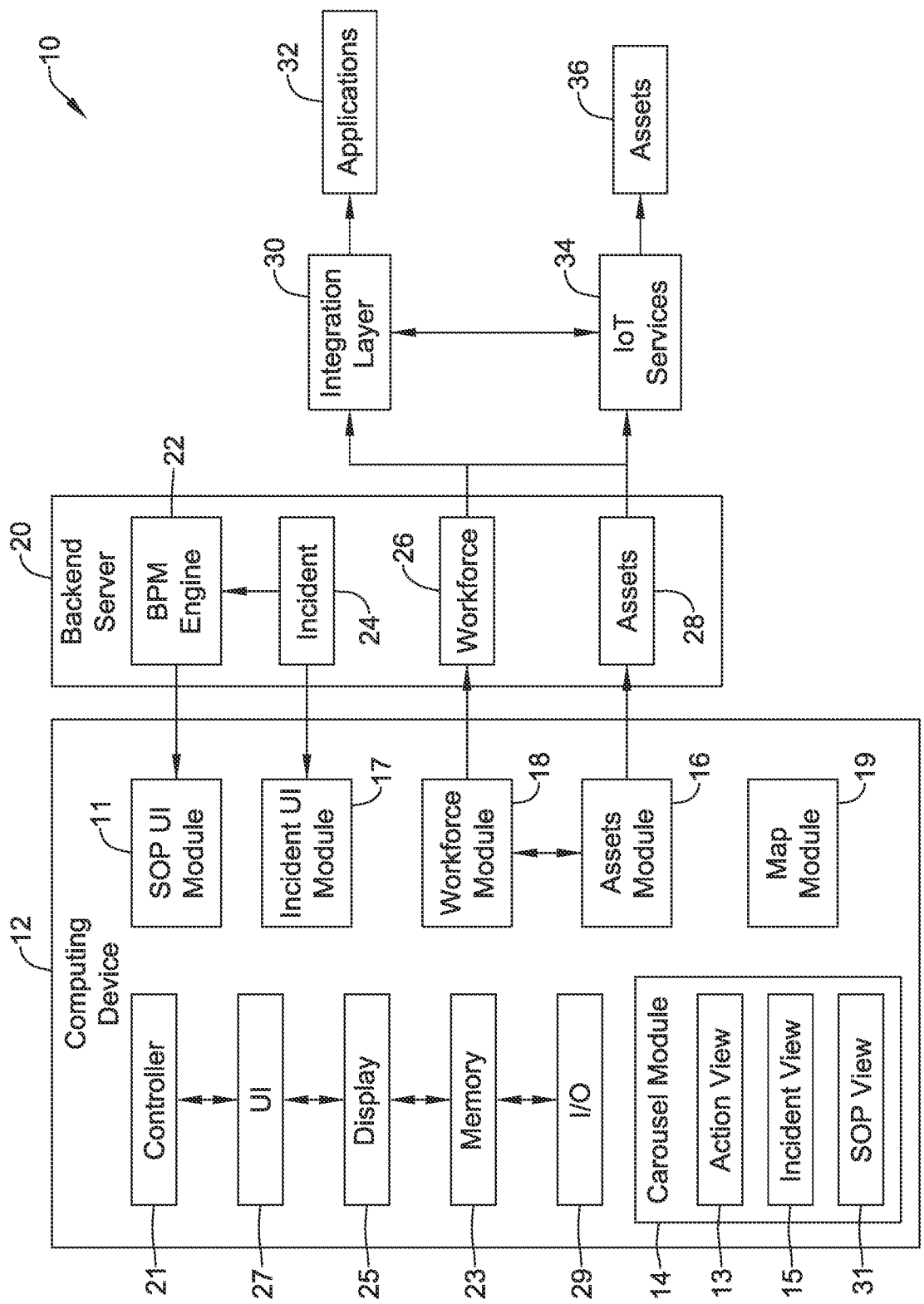
FIG. 1 is a schematic block diagram of an illustrative system for managing an incident.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative incident management system 10 for managing incidents. As shown in FIG. 1, the system 10 includes a computing device 12 that communicates with a backend server 20. The computing device includes a controller 21 that is operatively coupled to a memory 23, a user interface (UI) 27 that includes a display 25, and an input/output (I/O) 29. The controller 21 may implement a standard operating procedure (SOP) module 11, an incident module 17, a workforce module 18, an assets module 16, and a map module 19. In the example shown, the standard operating procedure (SOP) module 11, the incident module 17, the workforce module 18 and the assets module 16 communicate with the backend server 20 as shown. The controller 21 may also implement a carousel module 14, which may be used to generate and display an incident view 15, an SOP view 31 and an action view 13 on the display 25. The computing device 12 may be considered as a front-end server, and may, for example, include a laptop computer, a desktop computer, an operator console, a smart phone, a tablet, an e-reader, or any other suitable computing platform. In some cases, the backend server 20 may be contained within the computing device 12. In other cases, the backend server 20 is located remotely from the computing device 12 such as in the cloud, and communicatively coupled to the computing device 12 via, for example, a wired and/or wireless network. The backend server 20 may include a backend representational state transfer (REST) application programming interface (API). In some cases, the controller 21 may be configured to communicate with the backend server 20 via the REST API.

In some cases, the backend server 20 may include a business process management (BPM) engine 22, which may include a list of standard operating procedures (SOPs) for each of various incidents. The SOPs define steps that must be completed to properly manage the corresponding incident. Sometimes, the SOPs are driven by industry regulations and/or provincial laws, but this is not required. During operation, an incident 24 may be reported to the backend server 20 and subsequently received by the BPM engine 22. In some cases, the incident 24 may be related to an emergency call (e.g., a medical emergency, a fire, a crime, a lost child, or the like), a road closure, a power outage, a downed power line, or any other suitable incident that is reported to the backend server 20. The incident 24 may also be sent to the incident module 17 within the computing device 12 via the I/O 29. The incident module 17 may be configured to track the reported incidents, including the status of each of the reported incidents. The Carousel Module 14 may display the incidents and in some cases a corresponding incident status in the Incident view 15 on the display 25.

The BPM engine 22 may receive the incident 24, and may identify and send SOP instructions pertaining to the particular incident 24 to the SOP module 11 within the computing device 12. The SOP module 11 tracks which of the steps of the SOP pertaining to the incident 24 have been completed by the operator. The Carousel Module 14 may display the SOP and corresponding steps in an SOP view 31 on the display 25.

In some cases, the system 10 may include an integration layer 30 that may be configured to manage communication between the computing device 12, the backend server 20 and one or more applications 32. The integration layer 30 may be configured to integrate the data regarding the selected workforce 26 and/or the selected asset 28 with the applications 32. The integration layer 30 may be configured to communicate with an Internet of Things (IoT) services 34 to convert data messages for and from the computing device 12, the backend server 20, and the applications 32.

In some cases, the memory 23 can be a non-transitory computer readable medium having computer readable instructions (e.g., computer program instructions) stored thereon that are executable by the one or more processors of the computing device 12. The executable program may instruct the one or more processors of the computing device 12 to display a listing of incidents in the incident view 15 and receive, via the user interface 27, a user selection of a selected one of the listed incidents. The executable program may instruct the one or more processors of the computing device 12 to display the SOP steps of the standard operating procedure (SOP) that corresponds to the selected incident in the SOP view 31, and receive, via the user interface 27, a user selection of one of the one or more SOP steps from the SOP view 31. The SOP steps may be identified by the BPM engine of the backend server 20. The executable program may further instruct the one or more processors to display an action view 13 on the display 25 that displays one or more categories of assets that are activatable for supporting one or more of the SOP steps associated with a selected incident. In some cases, the action view 13 may display the one or more categories of actionable workforces and/or the one or more categories of actionable assets in a defined ribbon. In some cases, the defined ribbon may display two or more categories of the actionable workforces and/or the actionable assets arranged in a carousel arrangement, meaning the user can scroll through the categories from a first category to a last category, and then continuing to scroll in the same direction returns the user back to the first category. That is, the categories are arranged in the ribbon in a circular loop, much like a carousel. The one or more categories of actionable workforces may be retrieved from the workforce module 18, and the one or more categories of actionable assets may be retrieved from the assets module 16, and each may be tailored to the assets and/or workforces that are relevant to the selected incident, and in some cases, may be tailored to the assets and/or workforces that are relevant to the selected SOP step.

The one or more processors may receive, via the user interface 27, a user selection of one of the one or more categories of assets and/or workforces via the action view 13, and in response, display one or more available assets and/or workforces of the selected one of the one or more category of assets and/or workforces, and further receive, via the user interface 27, a user selection of one or more of the available assets and/or workforces of the selected one of the one or more category of assets and/or workforces. The assets and/or workforces that are currently available may be reported to the computing device 12 via the backend server 20. The backend server 20 may identify the assets and/or workforces that are currently available via one or more of the applications 32 and/or the assets block 36 through the integration layer 30 and/or IoT services 34. This is just an example.

In response, the assets module 16 and/or workforce module 18 may send one or more commands to activate the selected one or more available assets 28 and/or workforces 26 for supporting one or more of the SOP steps associated with the selected incident. The backend server 20 may activate the selected one or more available assets 28 and/or workforces 26 via the integration layer 30 and/or IoT.

In some cases, the executable program may instruct the one or more processors of the computing device 12 to receive a user selection, via the UI 27, of another one of the one or more SOP steps from the SOP view 31. In response to the selection, the action view 13 may display all of the one or more categories of actionable workforces and/or the one or more categories of actionable assets that are pre-associated with the selected one of the one or more SOP steps and all of the one or more categories of actionable workforces and/or the one or more categories of actionable assets that are pre-associated with the selected another one of the one or more SOP steps. Further, the one or more processors of the computing device 12 may display a map view that displays the location of the selected one or more available workforce and/or assets on a map. In some cases, only the available assets that have been activated to support one or more of the SOP steps associated with the selected incident are displayed in the map view. The map view may be generated by the map module 19 of the computing device 12.

In some cases, when one or more categories of actionable assets are displayed to the user, details regarding each of the one or more categories of actionable assets may also be displayed, such as, for example, a status of the asset, a type of asset, a location of the asset, or the like. The one or more categories of actionable assets may include, for example, an emergency call icon, a public announcement icon, an icon with which to turn on/off a power grid, a visual message board icon, and/or a social media icon. In some cases, when one or more categories of actionable workforces are displayed to the user, details regarding each of the one or more categories of actionable workforces may also be displayed, such as, for example, a real-time location of the workforce, an estimated time of arrival (ETA) for the workforce, contact details for the workforce, or the like. The one or more categories of actionable workforces may include, for example, a maintenance vehicle, an ambulance, a fire engine, a police vehicle, or the like.

In some cases, when the user selects one of the one or more categories of actionable assets (e.g., an asset 28) and/or one of the one or more categories of actionable workforces (e.g., a workforce 26), the action view 13 may retrieve details regarding the selected one of the one or more categories of actionable assets and/or the one of the one or more categories of actionable workforces, and may display the details within the action view 13. The action view 13 may further load appropriate interactions based on the operation(s) that the one of the one or more categories of actionable assets and/or one of the one or more categories of actionable workforces supports. For example, if the one of the one or more categories of actionable workforces selected includes dispatching a police vehicle to a scene, the supported interactions may include canceling the police vehicle, re-dispatching the police vehicle, contacting the police vehicle, or the like.

Figure 2:
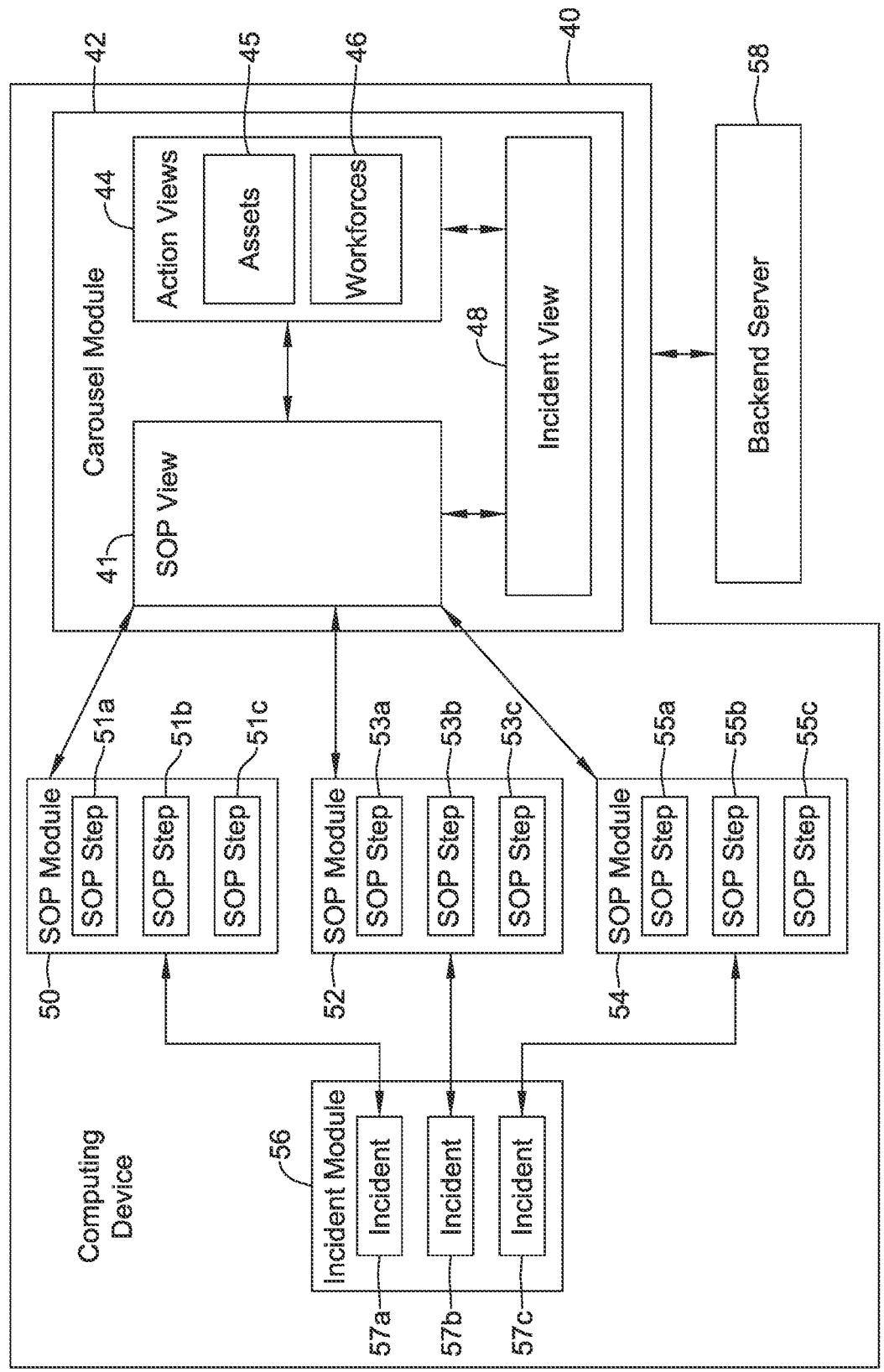
FIG. 2 is a schematic block diagram of an illustrative computing device associated with a system for managing an incident.

FIG. 2 is a schematic block diagram of an illustrative computing device 40 associated with a system (e.g., system 10) for managing an incident. As shown in FIG. 2, the computing device 40, which may be an example of computing device 12, may include an incident module 56, one or more standard operating procedure (SOP) modules including SOP module 50, SOP module 52, SOP module 54, and a carousel module 42. The incident module 56 (e.g., incident module 17) may receive one or more incidents 57a, 57b, 57c (hereinafter generally referenced as incidents 57) from, for example, a backend server 58. The incidents 57 may be displayed on a display (e.g., display 25) of the computing device 40 in an incident view 48. Each of the incidents 57 may include an associated SOP (e.g., SOP modules 50, 52, 54) for managing each corresponding incident 57. In some cases, for example, the incident 57a may include the associated SOP module 50. The SOP module 50 may include one or more corresponding SOP steps 51a, 51b, 51c. In some cases, for example, the incident 57b may include the associated SOP module 52, which may include one or more corresponding SOP steps 53a, 53b, 53c. In other cases, for example, the incident 57c may include the associated SOP module 54, which may include one or more corresponding SOP steps 55a, 55b, 55c.

A user may view the incidents 57 on the display in the incident view 48, and may select one of the incidents 57 via a user interface (e.g., UI 27). For example, the user may select the incident 57a. Upon selection of the incident 57a, the associated SOP module 50, including the one or more corresponding SOP steps 51a, 51b, 51c, may be displayed on the display in a standard operating procedure (SOP) view 41. The user may then select one of the SOP steps 51a, 51b, 51c from the SOP view, via the user interface. Upon selection of one of the one or more corresponding SOP steps 51a, 51b, 51c, an action view 44 may be loaded and may display to the user one or more categories of actionable workforces 46 and/or one or more categories of actionable assets 45 for the one of the selected SOP step 51a, 51b, 51c.

In some cases, the incident view 48, the SOP view 41 and the action view 44 may be concurrently displayed on the display 25 for easy reference by an operator. In some cases, the action view 44 may display the all assets and/or workforces that have been activated by the operator for all of the SOP steps of a selected incident. That is, in some cases, even when a particular SOP step is selected by the operation, the action view 44 may display the assets and/or workforces that have been activated for that particular step and also the assets and/or workforces activated for all other SOP steps of the selected incident.

FIG. 3 is a chart showing illustrative actionable assets 80 and actionable workforces 90. In the example of FIG. 3, the actionable assets 80 may include, for example, an emergency call icon 81, a public announcement icon 83, an icon with which to turn on/off a power grid 85, a visual message board icon 87, and a social media icon 89. These are just examples. In some cases, there may be additional icons for additional assets. Each actionable asset 80 may include an associated action 82. For example, the emergency call icon 81 may be utilized for attending to an incoming emergency call regarding an incident, such as a 911 call. In some cases, the public announcement icon 83 may be utilized to make a public announcement over an intercom system (e.g., a loud speaker) within a location in which an incident occurs. In some cases, the visual message board icon 87 may be utilized to broadcast a visual message regarding an incident on a variable message sign (VMS), such as a VMS over a highway. In some cases, the social media icon 89 may be utilized to broadcast a message regarding an incident over a social media platform, such as Twitter™, Facebook™, Instagram™, or the like.

The illustrative actionable workforces 90 may include, for example, a maintenance vehicle 91, an ambulance 93, a fire engine 95, and a police vehicle 97. It is contemplated that the actionable workforces 90 may include additional workforces, such as, for example, a garbage truck, a city bus, a snowplow, a public service vehicle, or the like. These are just examples. In some cases, each actionable workforce 90 may include an associated action 92. For example, the maintenance vehicle 91 may include an action of sending a maintenance truck to an incident. In some cases, the ambulance 93 may include an action of sending an ambulance to an incident following an emergency alert. In some cases, the fire engine 95 may include an action of sending a fire engine to an incident following an emergency alert. In some cases, the police vehicle 97 may include an action of sending a police vehicle to an incident following an emergency alert. The icons shown in FIG. 3 may be used to represent the corresponding asset and/or workforce in the action view 44.

FIGS. 4-9 depict illustrative user interfaces for managing incidents. The user interface may include a sidebar that includes a plurality of tabs. The plurality of tabs may include a tab for "available incidents" 111, a tab for "my incidents" 110, a tab for "observations" 113, and a tab for "history" 115. The "available incidents" 111 tab, when selected, may display all of the incidents that have been reported to a monitoring facility in an incident view 117. The "observations" 113 tab may indicate one or more comments provided by the user and/or other users regarding the incidents that have been reported to the monitoring facility. The "history" 115 tab may indicate the user's history regarding incidents that the user has managed. In some cases, when the user selects "my incidents" 110, as shown in FIGS. 4-9, the incidents that the user is responsible for managing may be shown in a listing in the incident view 117. The user may then select in the incident view 117 an incident, and the corresponding SOP steps for the selected incident is displayed in a SOP view.

In some cases, a user may select a SOP step from the SOP view, and the action view for that step may be displayed. In cases where an actionable workforce is selected, such as, for example, dispatching an ambulance, a fire engine, a police vehicle, or the like, details regarding the actionable workforce may be displayed within the action view. The details may include a location of the actionable workforce, an estimated time of arrival (ETA) for the actionable workforce to arrive at the location of the incident, and a phone number for a driver and/or a company of the actionable workforce. In some cases, multiple actionable workforces may be selected, and all of the actionable workforces and the corresponding details may be displayed within the action view. In some cases, the actionable workforces may be displayed in the map view, and the user may view the progress of the actionable workforces.

Figure 4:
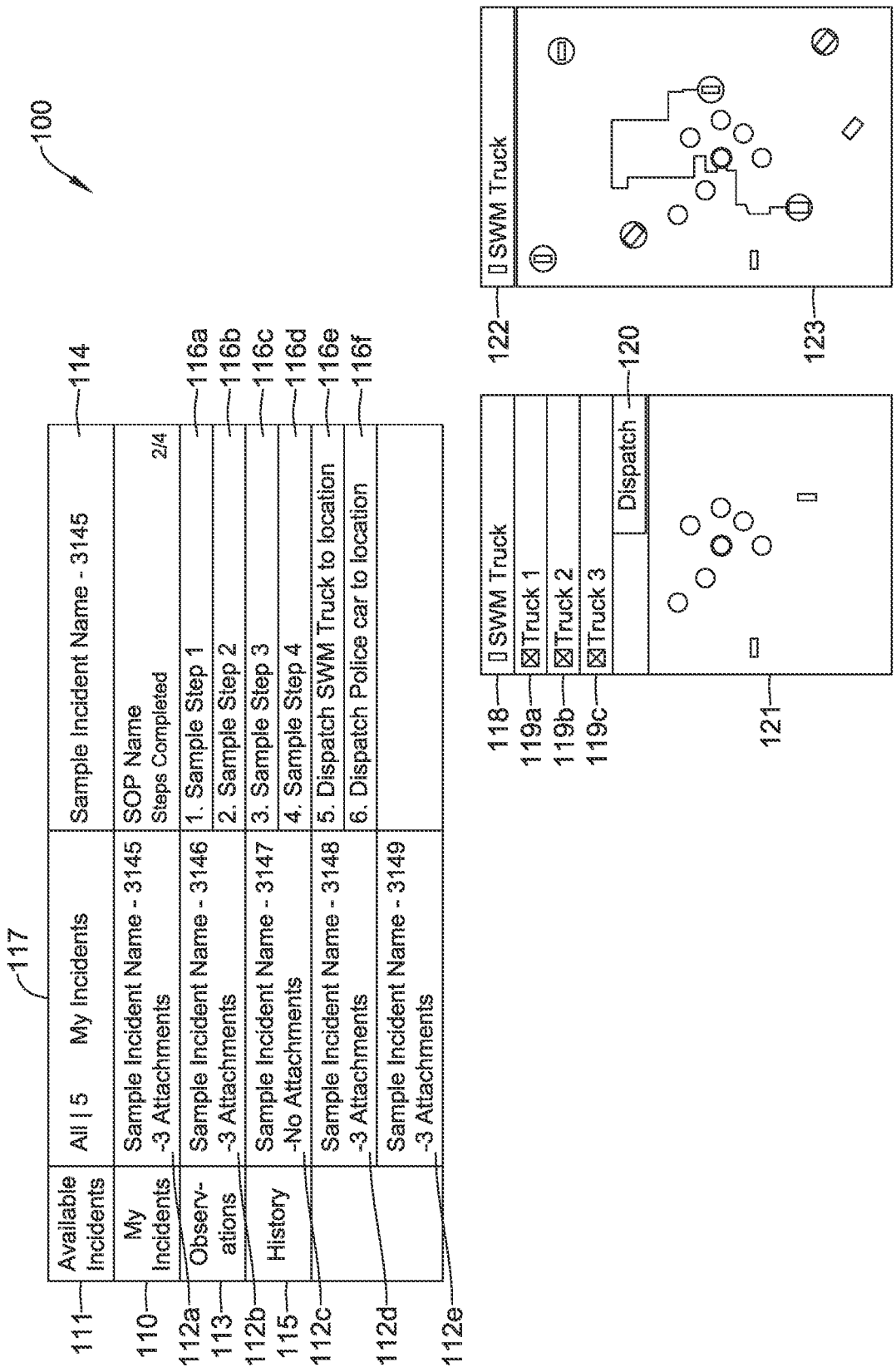
FIG. 4 is an illustrative user interface for managing incidents.

FIG. 4 is an illustrative user interface 100 for managing incidents. In the particular example shown in FIG. 4, the user has selected incident 3145 112a from the incident view 117. The selected incident 3145 112a along with the corresponding SOP steps are displayed in a SOP view 114. The SOP steps may include sample step 1 116a, sample step 2 116b, sample step 3, 116c, sample step 4, 116d, dispatch a solid waste management (SWM) truck to location 116e, and dispatch a police vehicle to location 116f. The user may select any of the SOP steps 116. In the example shown, when the user selects "Dispatch a SWM truck to location" 116e, an action view 118 is displayed and includes actionable workforces, such as, for example, truck 1 119a, truck 2 119b, and truck 3 119c. The user may select one or more of the actionable workforces and may dispatch the SWM trucks by selecting the "dispatch" 120 button. In some cases, the action view 118 may include a map view indicating the location of the incident 3145 112a. For example, the user may select one of the actionable workforces, such as, for example, truck 1 119a, which may display a map view 122 including a map 123 indicating the location of the selected actionable workforce. In some cases, when a plurality of actionable workforces are selected, each of the actionable workforces (e.g., truck 1 119a, truck 2 119b, truck 3, 119c, a police vehicle, or the like) may be displayed on the map 123, and a location of each of the actionable workforces in relation to the incident 3145 112a may be easily understood by the operator.

Figure 5:
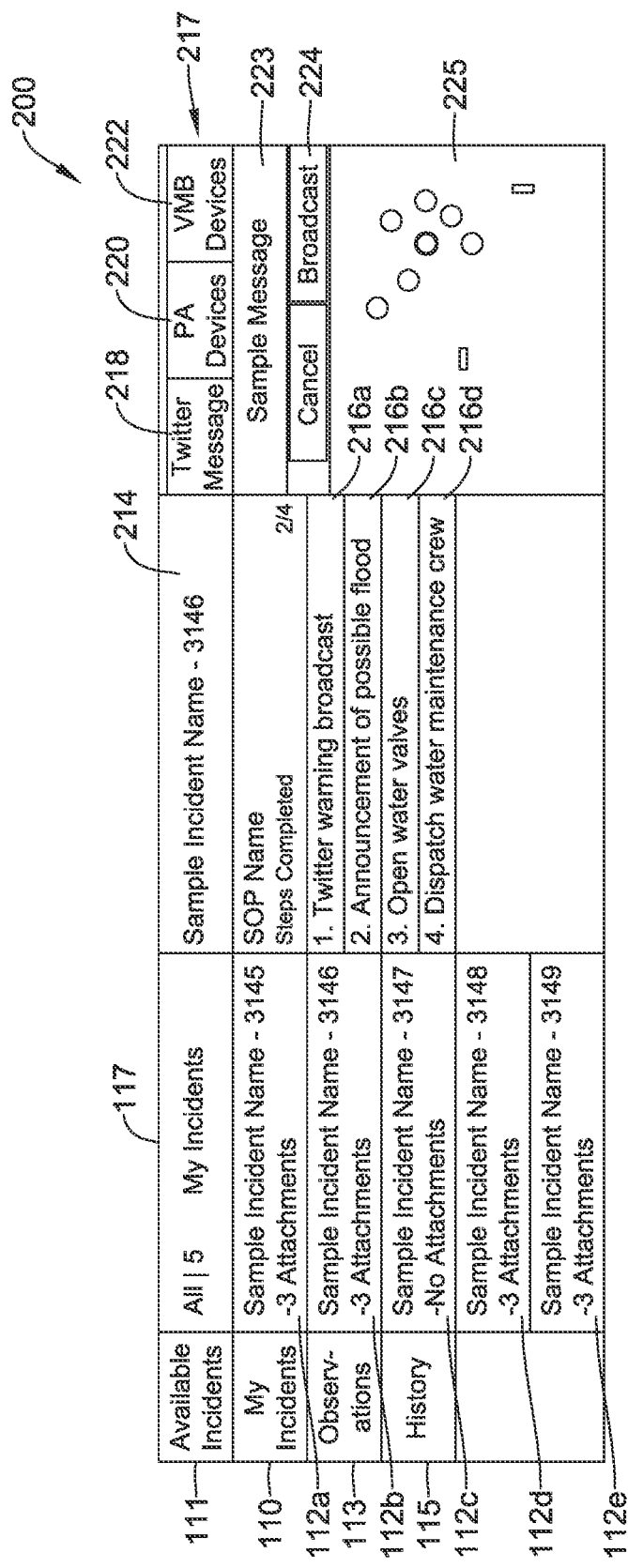
FIG. 5 is an illustrative user interface for managing incidents.

FIG. 5 is an illustrative user interface 200 for managing incidents. In the example shown in FIG. 5, the user has selected incident 3146 112b from the incident view 117. The selected incident 3146 112b along with the corresponding SOP steps are displayed in a SOP view 214. In this example, the SOP steps include a Twitter™ warning broadcast 216a, an announcement of a possible flood 216b, an instruction to open water valves 216c, and dispatching a water maintenance crew 216d. In some cases, when the SOP view 214 is displayed, an action view 217 may be displayed concurrently on the display. In the example shown in FIG. 5, the user selected the Twitter™ warning broadcast 216a, and thus the action view 217 includes tabs in which the user may broadcast a message using Twitter™ 218, broadcast a message using a public address (PA) system 220, and/or broadcast a message using a variable message board (VMB) 222. In some cases, the user may draft a text to be displayed and/or the user may use a predefined text message, as indicated at 223. The user may then choose to broadcast the message by selecting a broadcast 224 button. As shown, the action view 217 may include a map 225 indicating a location of the incident 3146 112b.

Figure 6:
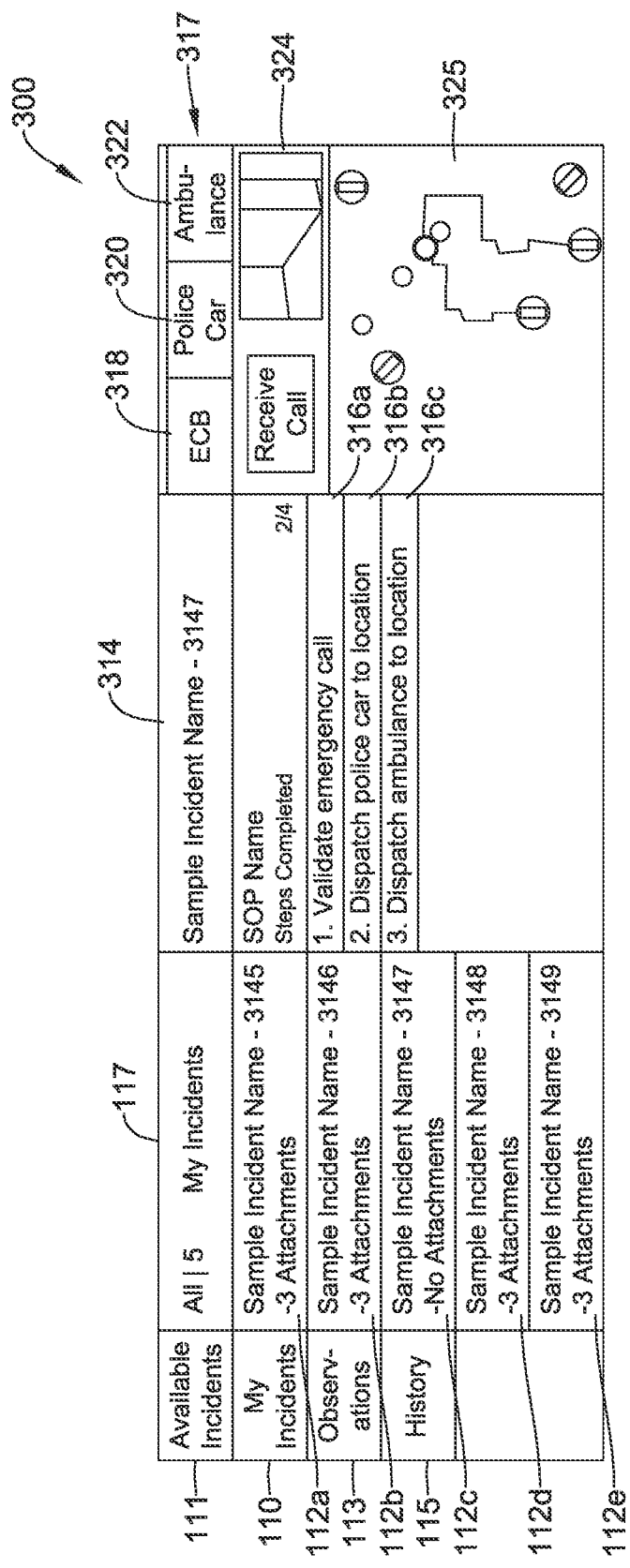
FIG. 6 is an illustrative user interface for managing incidents.

FIG. 6 is an illustrative user interface 300 for managing incidents. In the example shown in FIG. 6, the user has selected incident 3147 112c from the incident view 117. The selected incident 3147 112c along with the corresponding SOP steps are displayed in a SOP view 314. The SOP steps may include validating an emergency call 316a, dispatching a police car to the location 316b, and dispatching an ambulance to the location 316c. In some cases, when the SOP view 314 is displayed, an action view 317 is displayed concurrently. In the example shown in FIG. 6, the action view 317 may include tabs corresponding to the SOP steps displayed as a horizontal ribbon in the SOP view 314, sometimes in a carousel arrangement. In the example shown, the tabs within the action view 317 include an emergency call box (ECB) 318 tab, a police vehicle 320 tab, and an ambulance 322 tab. In this example, the user has selected the ECB 318 tab which displays to a user an option to receive an emergency call and simultaneously view a live video from an on-site video surveillance camera, as indicated at block 324. In some cases, block 324 may be displayed over a map 325 in the map view. The map 325 may indicate a location of the reported incident 3147 112c and the location of any emergency vehicles dispatched to the incident 3147 112c.

Figure 7:
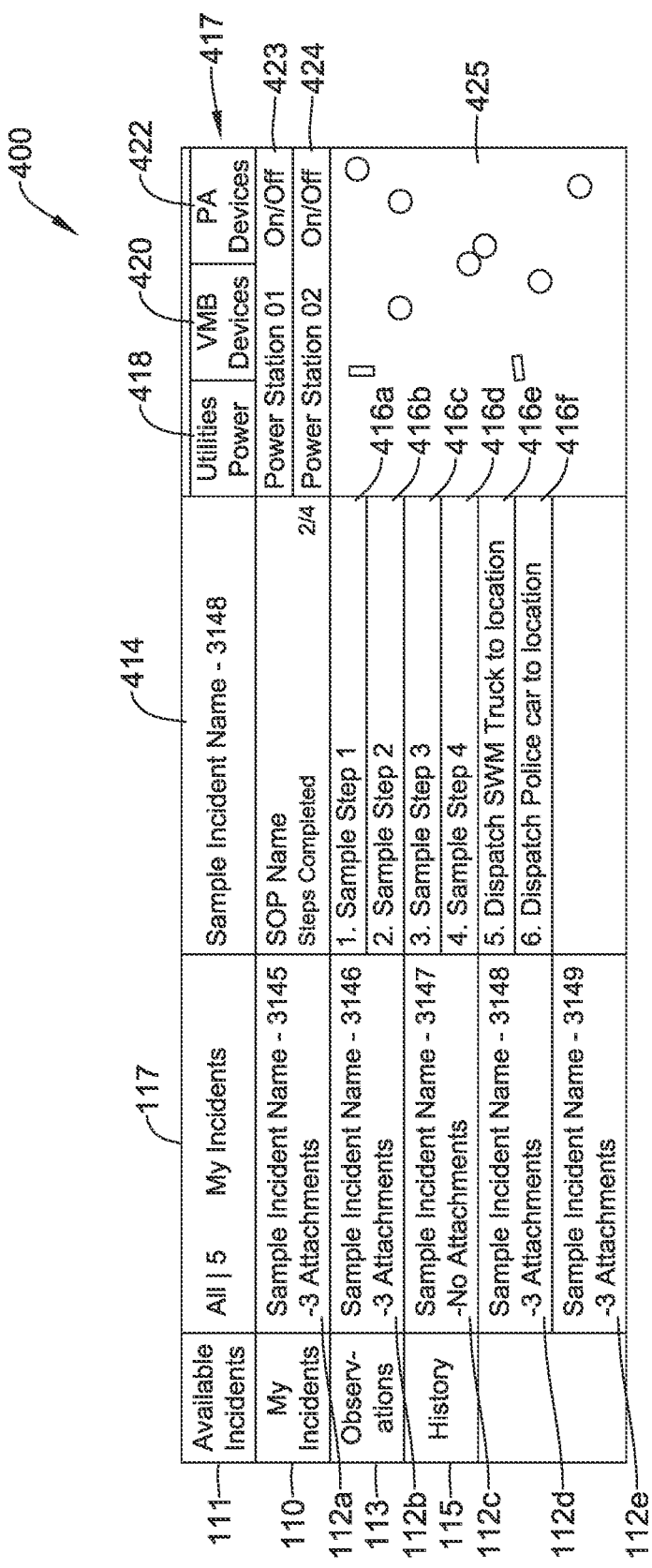
FIG. 7 is an illustrative user interface for managing incidents.
Figure 8:
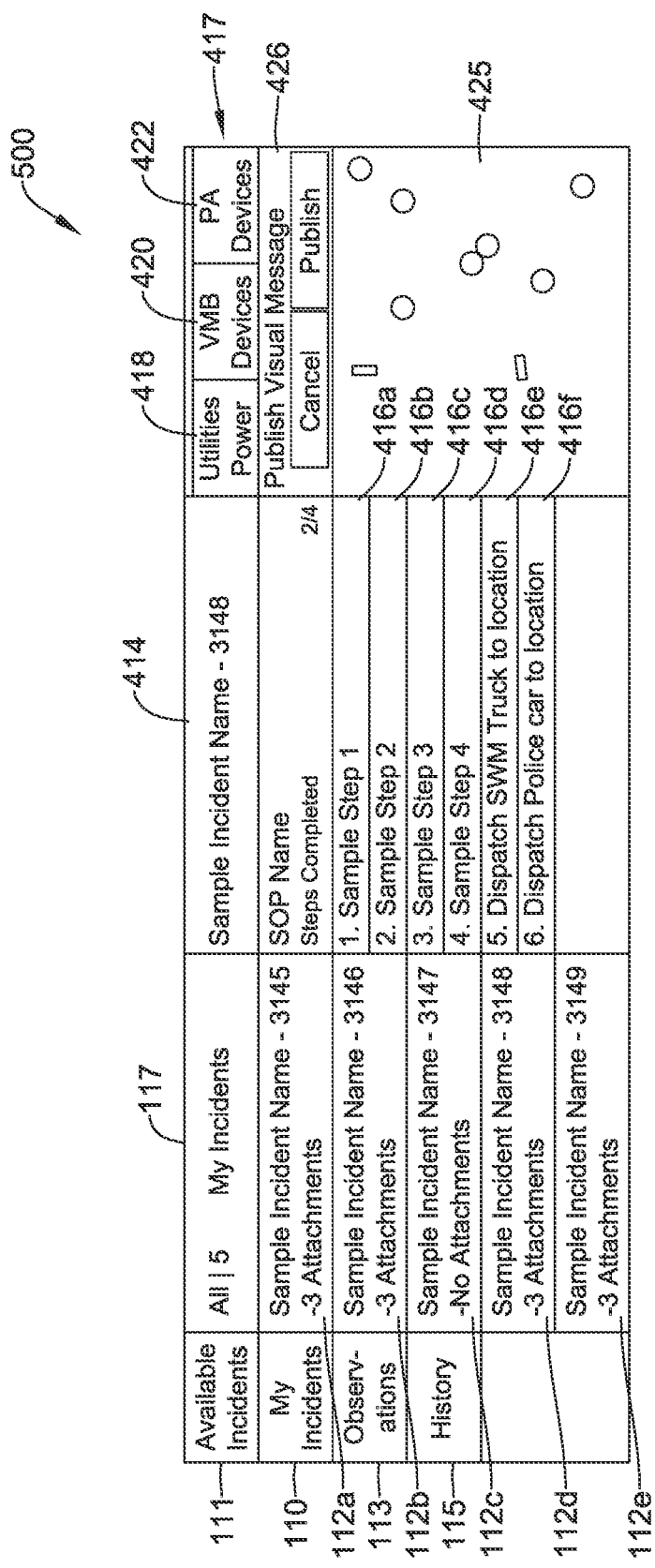
FIG. 8 is an illustrative user interface for managing incidents.
Figure 9:
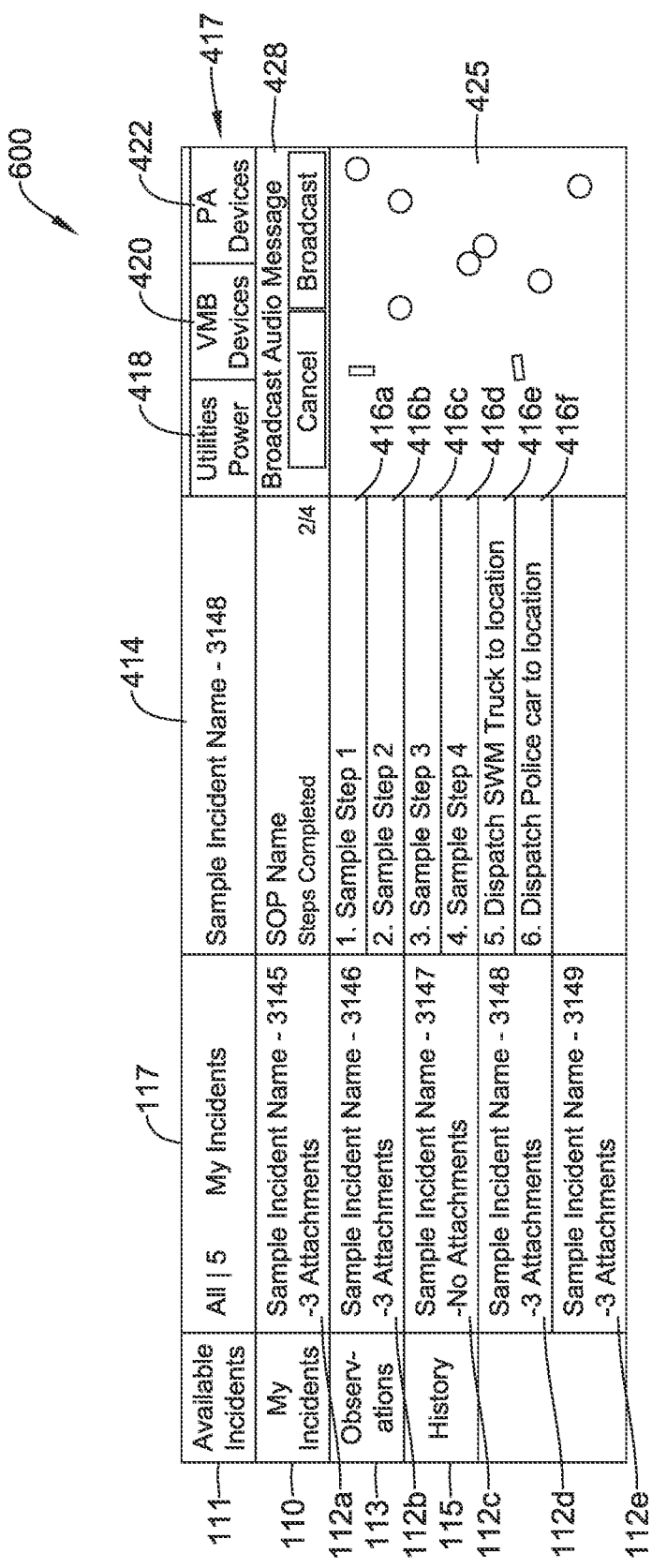
FIG. 9 is an illustrative user interface for managing incidents.

FIGS. 7-9 depict illustrative user interfaces for managing incidents. In the example shown in FIGS. 7-9, the user has selected incident 3148 112d from the incident view 117. The selected incident 3148 112d along with corresponding SOP steps are displayed in a SOP view 414. The SOP steps may include sample step 1 416a, sample step 2 416b, sample step 3 416c, sample step 4 416d, dispatching a solid waste management truck to a location 416e, and dispatching a police vehicle to the location 416f. In some cases, when the SOP view 414 is displayed, an action view 417 is displayed concurrently. In the example shown in FIGS. 7-9, the action view 417 may include tabs corresponding to all of the SOP steps displayed in the SOP view 414. For example, the tabs displayed within the action view 417 may include a utilities power 418 tab, a variable message board (VMB) 420 tab, and a public address (PA) devices 422 tab. Other action tabs, such as workforce tabs related to SOP steps 416e and 416f, may be accessed by scrolling to the right or left of the tabs shown. In the example shown, the action view 417 may further include a map 425 indicating a location of the incident 3148 112d.

As shown in FIG. 7, the user has selected the utilities power 418 tab, which gives the user the ability to manage a power station 01 423 and a power station 02 424. In some cases, the user may have the option to turn the power for the power station 01 423 and the power station 02 424 on and/or off. This may relate to one of the sample SOP steps listed in the SOP 414. In some cases, the user may have the option to manage a light intensity at the location of the incident 3148 112d for any maintenance work that may be required to be done.

As shown in FIG. 8, the user has selected the VMB 420 tab, which gives the user the ability to draft a text and/or the user may use a predefined text message, as indicated at 426. This may relate to one of the sample SOP steps listed in the SOP 414. The user may select to publish the text and/or cancel the text. In some cases, when the user chooses to publish the text, the text may be broadcast via a VMB.

As shown in FIG. 9, the user has selected the public address (PA) devices 422 tab, which gives the user the ability to dictate an audio message and/or use a predefined audio message for broadcast to a PA system, as indicated at 428. This may relate to one of the sample SOP steps listed in the SOP 414. The user may choose to broadcast the audio message and/or cancel the audio message.

In some examples, as illustrated in FIGS. 7-9, a power line may be down. In such cases, the user may need to turn off power at the power station 01 423, as indicated in FIG. 7. The user may then choose to broadcast a text via a VMB to reroute traffic to avoid the downed power line, as indicated in FIG. 8. The user may further choose to make an audio announcement via a PA system in an effort to announce road closures due to the downed power line. While not shown, workforce tabs related to SOP steps 416e and 416f may be accessed by scrolling to the right or left of the tabs shown. For example, a workforce tab may allow the operator to dispatch a utility crew (SMW truck) to repair the power line to address SOP step 416e. Likewise, a workforce tab may allow the operator to dispatch a police car to oversee the scene around the power line to address SOP step 416f.

Figure 10A:
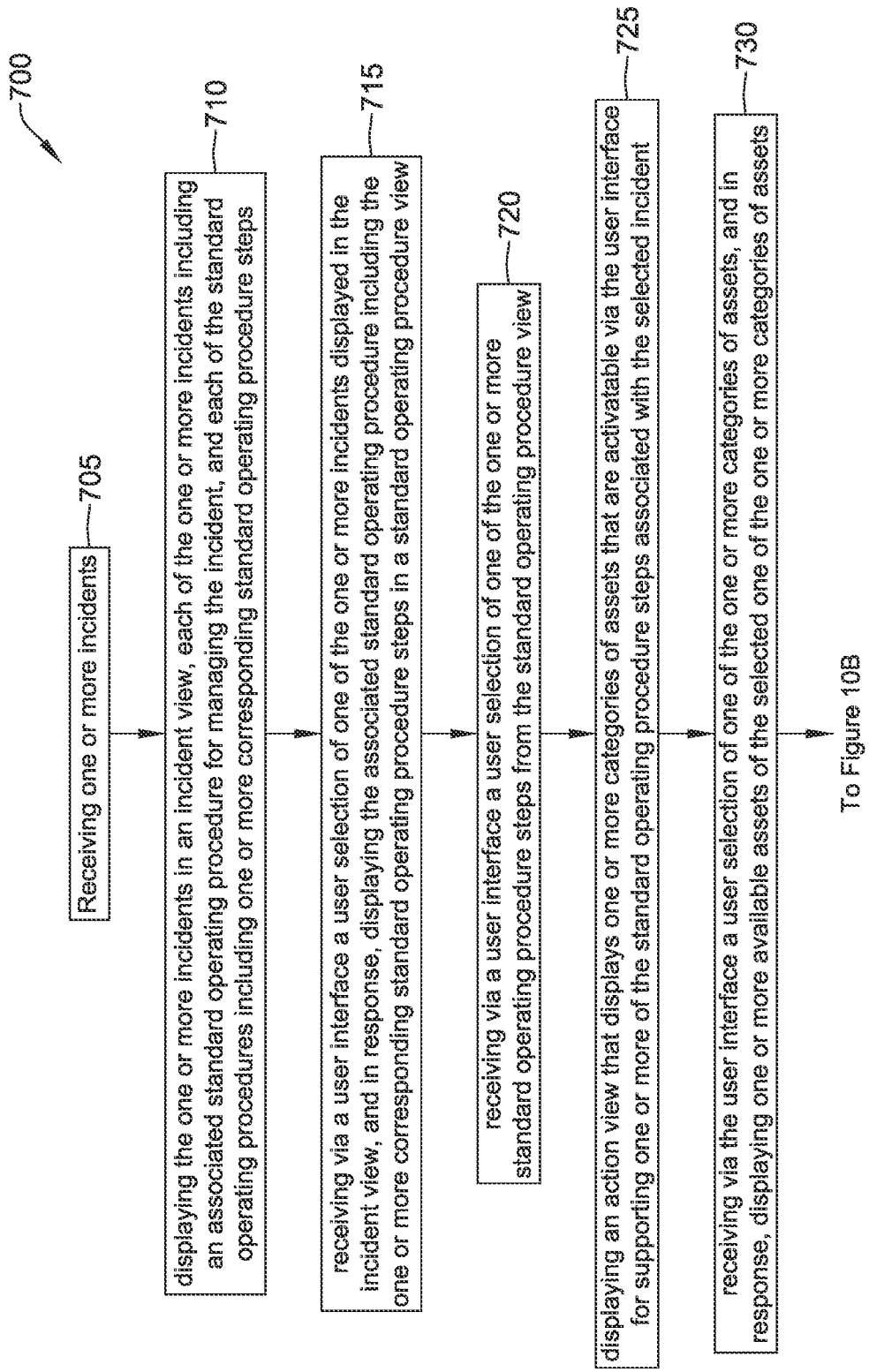
FIGS. 10A-10B are flow diagrams showing an illustrative method.
Figure 10B:
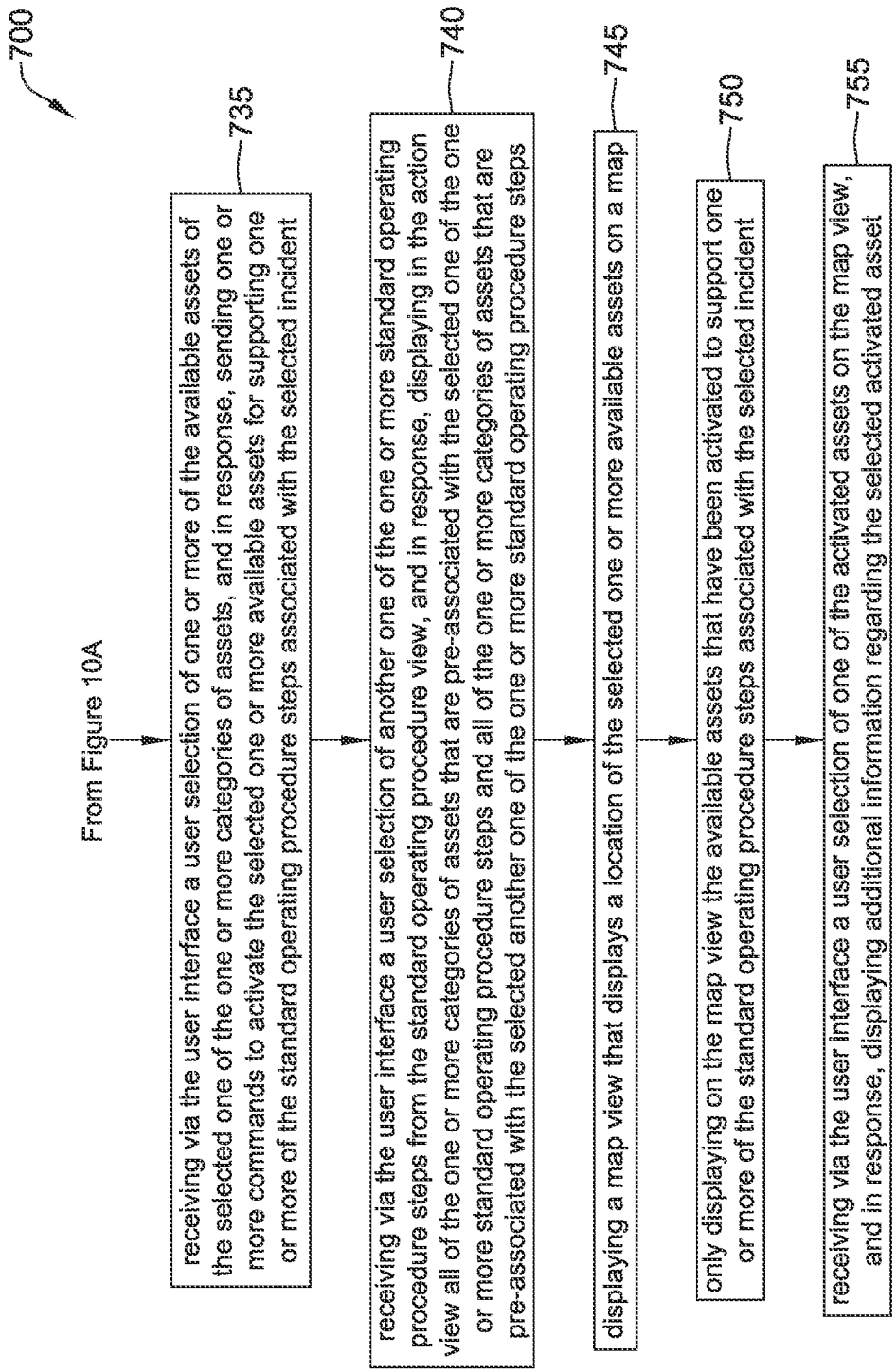

FIGS. 10A-10B are flow diagrams showing an illustrative method 700 for managing an incident, which may be carried out by a controller (e.g., controller 21). The method 700 may include the controller receiving one or more incidents, as referenced by block 705. The controller may display the one or more incidents in an incident view. Each of the one or more incidents may include an associated standard operating procedure (SOP) for managing the incident, and each of the standard operating procedures (SOPs) may include one or more corresponding SOP steps, as referenced by block 710. The method 700 may include the controller receiving, via a user interface, a user selection of one of the one or more incidents displayed in the incident view, and in response, displaying the associated SOP including the one or more corresponding SOP steps in a SOP view, as referenced by block 715. The controller may receive, via a user interface, a user selection of one of the one or more SOPs from the SOP view, as referenced by block 720.

The method 700 may further include the controller displaying an action view that displays one or more categories of assets that are activatable via the user interface for supporting one or more of the SOP steps associated with the selected incident, as referenced by block 725. The action view may display the one or more categories of assets in a defined ribbon, and the defined ribbon may display two or more categories of assets arranged in a carousel arrangement. The one or more categories of assets that are displayed in the action view may include all of the one or more categories of assets that are pre-associated with the selected one of the one or more SOP steps. The controller may then receive, via the user interface, a user selection of one of the one or more categories of assets, and in response, may display one or more available assets of the selected one of the one or more categories of assets, as referenced by block 730. In some cases, displaying one or more available assets of the selected one or more categories of assets includes sorting the one or more available assets according to a distance of a current location of the available asset from the selected incident. Further, the controller may receive, via the user interface, a user selection of one or more of the available assets of the selected one of the one or more categories of assets, and in response, may send one or more commands to activate the selected one or more available assets for supporting one or more of the SOP steps associated with the incident, as referenced by block 735.

The method 700 may further include the controller receiving, via the user interface, a user selection of another one of the one or more SOP steps from the SOP view, and in response, displaying in the action view, all of the one or more categories of assets that are pre-associated with the selected one or more SOP steps and all of the one or more categories of assets that are pre-associated with the selected another one of the one or more SOP steps, as referenced by block 740. The controller may then display a map view that displays a location of the selected one or more available assets on a map, as referenced by block 745, and may only display on the map view the available assets that have been activated to support one or more of the SOP steps associated with the selected incident, as referenced by block 750. The controller may then receive, via the user interface, a user selection of one of the activated assets on the map view, and in response, may display additional information regarding the selected activated asset, as referenced by block 755. In some cases, the incident view, the SOP view and the action view are concurrently displayed. it is contemplated that the "assets" reference with respect to FIG. 10A-10B can include both actionable assets and actionable workforces, as the actionable workforces are also assets.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for managing an incident, the method comprising:
   receiving one or more incidents at a backend server;
   displaying the one or more incidents on a display of a user interface of a computing device that is operatively coupled to the backend server, wherein the one or more incidents are displayed in an incident view on the display of the computing device, wherein each of the one or more incidents includes an associated standard operating procedure for managing the respective incident, and each of the standard operating procedures includes one or more corresponding standard operating procedure steps;
   receiving via the user interface of the computing device a user selection of an incident that is displayed in the incident view, and in response, displaying the associated standard operating procedure including the one or more corresponding standard operating procedure steps in a standard operating procedure view on the display of the computing device, wherein the standard operating procedure view is separate from but concurrently displayed with the incident view;
   receiving via the user interface of the computing device a user selection of one of the one or more standard operating procedure steps currently displayed in the standard operating procedure view;
   displaying an action view on the display of the computing device, wherein the action view is separate from but concurrently displayed with the incident view and the standard operating procedure view, the action view displays two or more categories of assets each tailored to include assets that are relevant to the particular incident that was selected in the incident view and are activatable via the user interface of the computing device to support one or more of the standard operating procedure steps that are associated with the selected incident, the two or more categories of assets displayed in a defined ribbon arranged in a carousel, where the carousel is scrollable via user input from a first category to a last category, and with continued scrolling in the same direction, returning back to the first category;
   receiving via the user interface of the computing device user input that scrolls the carousel to display a selected one of the two or more categories of assets in the action view, and in response, displaying one or more available assets of the selected one of the two or more categories of assets in the action view;
   receiving via the user interface a user selection of one or more of the available assets of the selected one of the two or more categories of assets displayed in the action view; and
   the backend server sending one or more commands that activate the selected one or more available assets.

2. The method of claim 1, wherein the two or more categories of assets that are displayed in the action view include all of the two or more categories of assets that are pre-associated with the selected one of the one or more standard operating procedure steps.

3. The method of claim 2, further comprising receiving via the user interface a user selection of another one of the one or more standard operating procedure steps from the standard operating procedure view, and in response, displaying in the action view all of the two one or more categories of assets that are pre-associated with the selected one of the one or more standard operating procedure steps and all of the two or more categories of assets that are pre-associated with the selected another one of the one or more standard operating procedure steps.

4. The method of claim 1, further comprising:
   displaying a map view that displays a location of the selected one or more available assets on a map.

5. The method of claim 4, further comprising only displaying on the map view the available assets that have been activated to support one or more of the standard operating procedure steps associated with the selected incident.

6. The method of claim 4, further comprising:
   receiving via the user interface a user selection of one of the activated assets on the map view, and in response, displaying additional information regarding the selected activated asset.

7. The method of claim 1, wherein displaying one or more available assets of the selected one of the two or more categories of assets comprises sorting the one or more available assets according to a distance of a current location of the available asset from the selected incident.

8. A non-transitory computer readable medium storing instructions that when executed by one or more processors of a computing device causes the one or more processors to:
    display a standard operating procedure that is associated with an incident selected via an incident view, the standard operating procedure including the one or more standard operating procedure steps in a standard operating procedure view on a display of the computing device;
    receive via a user interface of the computing device a user selection of one of the one or more standard operating procedure steps via the standard operating procedure view;
    display an action view on the display of the computing device, wherein the action view is separate from but concurrently displayed with the standard operating procedure view, the action view displays two or more categories of assets, each tailored to include assets that are relevant to the particular incident that was selected in the incident view, and that are activatable via the user interface and that are pre-associated with any of the one or more of the standard operating procedure steps including the selected one of the one or more standard operating procedure steps, the two or more categories of assets displayed in a defined ribbon arranged in a carousel, where the carousel is scrollable via user input from a first category to a last category, and with continued scrolling in the same direction, returning back to the first category;
    receive via the user interface user input that scrolls the carousel to display a selected one of the two or more categories of assets via the action view, and in response, display in the action view one or more available assets of the selected one of the two or more category of assets; and
    receive via the user interface a user selection of one or more of the available assets of the selected one of the two or more category of assets via the action view, and in response, sending one or more commands to a backend server that causes the backend server to activate the selected one or more available assets to respond to the selected one of the one or more standard operating procedure steps.

9. The non-transitory computer readable medium of claim 8 storing instructions that when executed by one or more processors of a computing device causes the one or more processors to:
    receive via the user interface a user selection of another one of the one or more standard operating procedure steps via the standard operating procedure view, and in response, display in the action view all of the two or more categories of assets that are pre-associated with the selected one of the one or more standard operating procedure steps and all of the two or more categories of assets that are pre-associated with the selected another one of the one or more standard operating procedure steps.

10. The non-transitory computer readable medium of claim 8 storing instructions that when executed by one or more processors causes the one or more processors to:
    display a map view that displays a location of the selected one or more available assets on a map.

11. The non-transitory computer readable medium of claim 10 storing instructions that when executed by one or more processors causes the one or more processors to: display on the map view only the available assets that have been activated to support one or more of the standard operating procedure steps.

12. A system, comprising:
    an input/output port configured to receive one or more incidents;
    a user interface having a display operatively coupled to the input/output port, the user interface configured to display the one or more incidents in an incident view on the display;
    a controller operatively coupled to the input/output port and the user interface, the controller configured to:
        display a standard operating procedure associated with a particular incident selected in the incident view, including one or more standard operating procedure steps in a standard operating procedure view on the display;
        receive via the user interface a user selection of one of the one or more standard operating procedure steps from the standard operating procedure view;
        display an action view on the display that displays two or more categories of assets, each tailored to include assets that are relevant to the particular incident that was selected in the incident view, and that are activatable via the user interface for supporting one or more of the standard operating procedure steps associated with the selected incident, wherein the action view is separate from but concurrently displayed with the standard operating procedure view, the two or more categories of assets displayed in a defined ribbon arranged in a carousel, where the carousel is scrollable via user input from a first category to a last category, and with continued scrolling in the same direction, returning back to the first category;
        receive via the user interface user input that scrolls the carousel to display a selected one of the two or more categories of assets via the action view, and in response, display one or more available assets of the selected one of the two or more category of assets in the action view; and
        receive via the user interface a user selection of one or more of the available assets of the selected one of the two or more category of assets via the action view, and in response, sending one or more commands to a remote server to activate the selected one or more available assets to respond to the selected one of the one or more of the standard operating procedure steps associated with the selected incident.

13. The system of claim 12, wherein the controller is configured to receive via the user interface a user selection of another one of the one or more standard operating procedure steps via the standard operating procedure view, and in response, display in the action view all of the two or more categories of assets that are pre-associated with the selected one of the one or more standard operating procedure steps and all of the two one or more categories of assets that are pre-associated with the selected another one of the one or more standard operating procedure steps.

14. The system of claim 12, wherein the controller is configured to display a map view that shows a location of the selected one or more available assets on a map.

* * * * *